US012479209B2

(12) United States Patent
Kim et al.

(10) Patent No.: US 12,479,209 B2
(45) Date of Patent: Nov. 25, 2025

(54) INKJET HEAD AND METHOD OF MANUFACTURING THE SAME

(71) Applicant: Samsung Display Co., LTD., Yongin-si (KR)

(72) Inventors: Jaesik Kim, Yongin-si (KR); Woo Yong Sung, Yongin-si (KR); Seungho Yoon, Yongin-si (KR); Hyoung Sub Lee, Yongin-si (KR); Hyemin Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 188 days.

(21) Appl. No.: 18/199,628

(22) Filed: May 19, 2023

(65) Prior Publication Data

US 2024/0109327 A1 Apr. 4, 2024

(30) Foreign Application Priority Data

Sep. 30, 2022 (KR) ........................ 10-2022-0125041

(51) Int. Cl.
*B41J 2/175* (2006.01)
*B41J 2/16* (2006.01)
*B41J 2/17* (2006.01)

(52) U.S. Cl.
CPC ........... *B41J 2/17513* (2013.01); *B41J 2/164* (2013.01); *B41J 2/1707* (2013.01); *B41J 2/17523* (2013.01)

(58) Field of Classification Search
CPC ...... B41J 2/17513; B41J 2/164; B41J 2/1707; B41J 2/17523; B41J 2/1606; B41J 2/162; B41J 2/1642; B41J 2/14; B05D 1/185; C23C 14/04; C23C 14/24; C23C 14/505; H10K 71/135
USPC ............................................................ 347/20
See application file for complete search history.

(56) References Cited

U.S. PATENT DOCUMENTS

| | | | | |
|---|---|---|---|---|
| 8,501,277 B2 | 8/2013 | Kobrin et al. | | |
| 2008/0313901 A1* | 12/2008 | Bich | B41J 2/1606 29/890.1 |
| 2019/0291430 A1* | 9/2019 | Kakiuchi | B41J 2/1642 |
| 2021/0187959 A1* | 6/2021 | Ikoshi | B41J 2/17513 |

FOREIGN PATENT DOCUMENTS

| | | |
|---|---|---|
| KR | 1020080013626 A | 2/2008 |
| KR | 102011450 B1 | 8/2019 |
| KR | 1020200053697 A | 5/2020 |

* cited by examiner

*Primary Examiner* — Jason S Uhlenhake
*Assistant Examiner* — Alexander D Shenderov
(74) *Attorney, Agent, or Firm* — CANTOR COLBURN LLP

(57) ABSTRACT

An inkjet head includes a nozzle which ejects an ink and includes an inner wall through which the ink passes, a head surface which exposes the nozzle and is connected to first end of the inner wall and an ink supply unit which supplies the ink to the nozzle and includes a flow path connected to a second end of the inner wall opposite to the first end, and the head surface, the inner wall, and the flow path are coated with different coating films, respectively.

20 Claims, 8 Drawing Sheets

CF:CF1,CF2,CF3

TG:SPC,FG

CF:CF1,CF2,CF3

CF:CF1,CF2,CF3

INKJET HEAD AND METHOD OF MANUFACTURING THE SAME

This application claims priority to Korean Patent Application No. 10-2022-0125041, filed on Sep. 30, 2022, and all the benefits accruing therefrom under 35 U.S.C. § 119, the content of which in its entirety is herein incorporated by reference.

BACKGROUND

1. Field

Embodiments relate to an inkjet device. More particularly, embodiments relate to an inkjet head included in the inkjet device and a method of manufacturing the inkjet device.

2. Description of the Related Art

A display device is a device that displays an image for providing visual information to a user. Among display devices, an organic light emitting diode display has recently attracted attention.

An inkjet device may be used when manufacturing a display device. Such an inkjet device may include inkjet heads which eject ink. The inkjet heads may be coated with a coating film to improve ejection accuracy and prevent residue of particles or the like included in the ink from remaining on a surface thereof.

SUMMARY

Embodiments provide an inkjet head of an inkjet device used for manufacturing a display device with improved durability.

Embodiments provide a method of manufacturing the inkjet head.

An inkjet head according to an embodiment includes a nozzle which ejects an ink and includes an inner wall through which the ink passes, a head surface which exposes the nozzle and is connected to first end of the inner wall and an ink supply unit which supplies the ink to the nozzle and includes a flow path connected to a second end of the inner wall opposite to the first end, where the head surface, the inner wall, and the flow path are coated with different coating films, respectively.

In an embodiment, the coating film may include a self-assembled monolayer.

In an embodiment, the coating film may include a first coating film coated on the head surface, a second coating film coated on the inner wall and a third coating film coated on the flow path, and the first coating film, the second coating film, and the third coating film may include different materials, respectively.

In an embodiment, a surface energy of the first coating film may be less than a surface energy of the second coating film or a surface energy of the third coating film.

In an embodiment, the surface energy of the first coating film may be less than the surface energy of the second coating film, and the surface energy of the second coating film may be less than the surface energy of the third coating film.

In an embodiment, the surface energy of the first coating film may be less than the surface energy of the third coating film, and the surface energy of the third coating film may be less than the surface energy of the second coating film.

In an embodiment, the surface energy of the first coating film may be about 20 millinewtons per meter (mN/m) or less.

In an embodiment, the surface energy of the second coating film may be about 14 mN/m or less.

In an embodiment, the first coating film may include a first head part coupled to the head surface and a first tail part connected to the first head part.

In an embodiment, the first tail part may include a fluorine functional group.

In an embodiment, the first tail part may include an ether group.

In an embodiment, the second coating film may include a second head part coupled to the inner wall and a second tail part connected to the second head part and including an alky group or a fluorine functional group.

In an embodiment, the third coating film may include a third head part coupled to the flow path and a third tail part connected to the third head part and including an alkyl group or a fluorine functional group.

In an embodiment, the first coating film may include a material having a contact angle in a range of about 100 degrees to about 200 degrees based on pure water.

In an embodiment, the third coating film may include a material having a contact angle in a range of about 10 degrees to about 120 degrees based on pure water.

A method of manufacturing an inkjet head according to an embodiment includes providing a nozzle including an inner wall through which an ink passes, providing a head surface exposing the nozzle and connected to a first end of the inner wall, providing an ink supply unit including a flow path connected to a second end of the inner wall opposite to the first end and coating the head surface, the inner wall, and the flow path with different coating films, respectively.

In an embodiment, the coating the head surface, the inner wall, and the flow path with the different coating films, respectively may include coating a first coating film on the head surface, coating a second coating film on the inner wall and coating a third coating film on the flow path, and the first coating film, where the second coating film, and the third coating film may include different materials, respectively.

In an embodiment, the first coating film, the second coating film, and the third coating film may be formed in a self-assembled monolayer method.

In an embodiment, the coating of the first coating film on the head surface may be performed by a physical vapor deposition process, and the head surface may be rotated in a state perpendicular to a deposition source during the physical vapor deposition process.

In an embodiment, the coating of the second coating film on the inner wall may be performed by a physical vapor deposition process, and the head surface may be rotated in an inclined state with respect to a deposition source during the physical vapor deposition process.

In the inkjet head according to embodiments of the disclosure, the head surface, the inner wall, and the flow path may be coated with different coating films, respectively, and the coating films may have different surface energies from each other. Accordingly, the residue of particles in the ink may be effectively prevented from remaining on the inner surface of the inkjet head, such that the ink ejection accuracy of the inkjet head with respect to an outer surface of the inkjet head may be improved.

In an embodiment, each of the head surface, the inner wall, and the flow path may be coated with a self-assembled monolayer having a different structure. Accordingly, the residue of particles in the ink may be effectively prevented from remaining on the inner surface of the inkjet head, such that durability of the inkjet head against cleaning and scratches on the outer surface of the inkjet head may be improved.

In addition, since the head surface, the inner wall, and the flow path are formed through different processes from each other, the head surface, the inner wall, and the flow path may be effectively coated with different materials, respectively.

DETAILED DESCRIPTION

Figure 1:
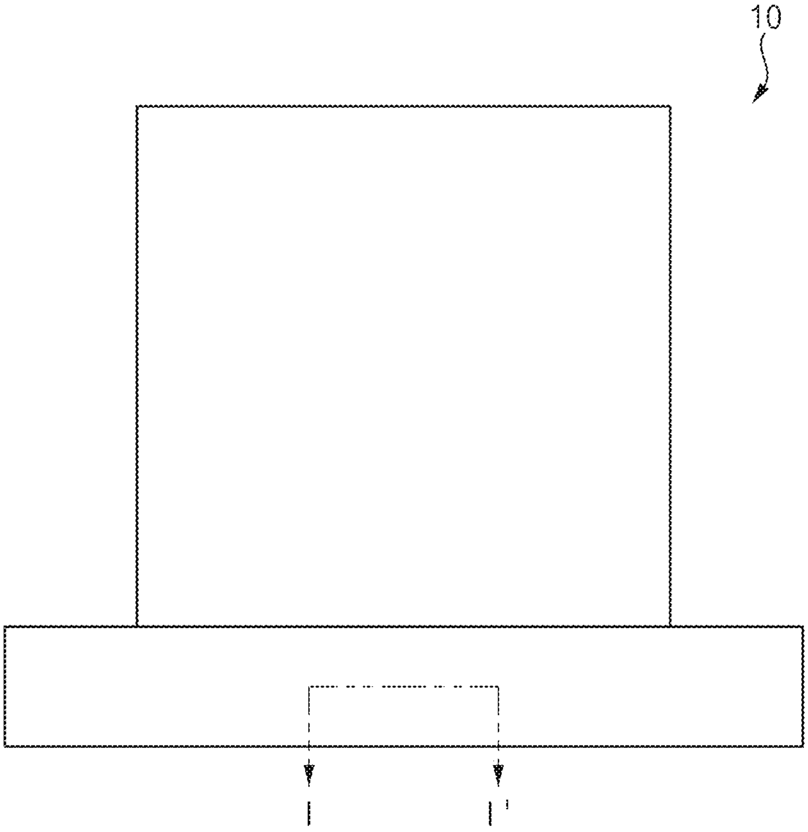
FIG. 1 is a front view illustrating an inkjet head according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in more detail with reference to the accompanying drawings. The same reference numerals are used for the same components in the drawings, and any repetitive detailed descriptions of the same components will be omitted.

Figure 2:
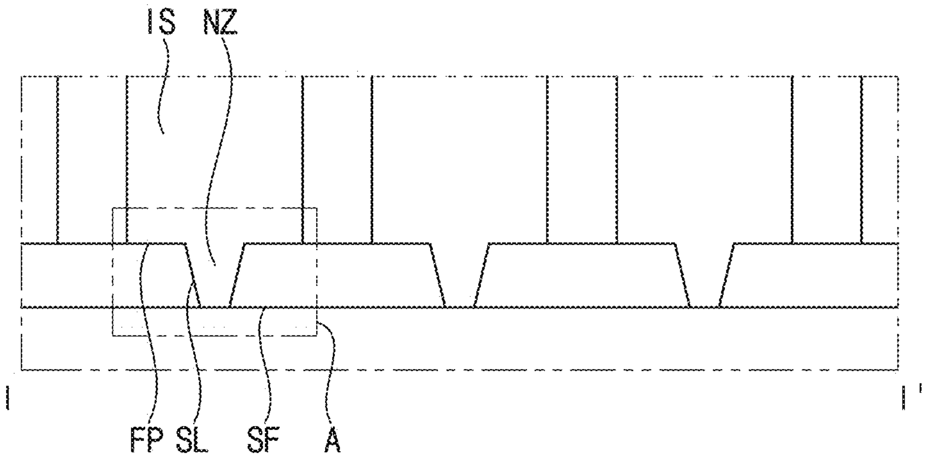
FIG. 2 is a cross-sectional view taken along line I-I' from the inside of FIG. 1.

FIG. 1 is a front view illustrating an inkjet head according to an embodiment of the disclosure. FIG. 2 is a cross-sectional view taken along line I-I' from the inside of FIG. 1.

Referring to FIGS. 1 and 2, in an embodiment, an inkjet head 10 may be one of components included in an inkjet device. The inkjet device may be a device that applies ink to an object to be printed. The inkjet head 10 may be a part which ejects the ink.

The inkjet head 10 may include at least one nozzle NZ and an ink supply unit IS defined therein. The nozzle NZ may directly eject the ink. The ink supply unit IS may receive ink from an ink reservoir. The ink supply unit IS may supply the ink to the nozzle NZ.

The inkjet head 10 may include an outer surface and an inner surface. The outer surface may be a surface exposed to the outside. The inner surface may be a surface inside the inkjet head 10 which is not exposed to the outside.

The outer surface may include a surface SF of the head. The surface SF of the head may expose the nozzle NZ. In an embodiment, for example, an opening connected to the nozzle NZ may be defined through the surface SF of the head. Accordingly, the ink may be ejected from the nozzles NZ on the surface SF of the head. In an embodiment, for example, the surface SF of the head may be referred to as a bottom surface of the inkjet head 10 from which the ink is ejected. However, the disclosure is not limited thereto, and alternatively the surface SF of the head may be another surface from which the ink is ejected. Herein, the surface SF of head may also be referred to as a head surface SF.

The inner surface may include an inner wall SL of the nozzle NZ and a flow path FP of the ink supply unit IS. A first end of the inner wall SL may be connected to the surface SF of the head (i.e., the head surface SF). The flow path FP may be connected to a second end of the inner wall SL. The second end of the inner wall SL is opposite to the first end of the inner wall SL.

The ink may pass through the inner wall SL or a space defined by the inner wall SL. That is, the ink supplied from the ink supply unit IS may pass through the inner wall SL of the nozzle NZ and be ejected to the outside. The ink supplied from the ink reservoir may pass through the flow path FP and be supplied to the inner wall SL.

Figure 3:
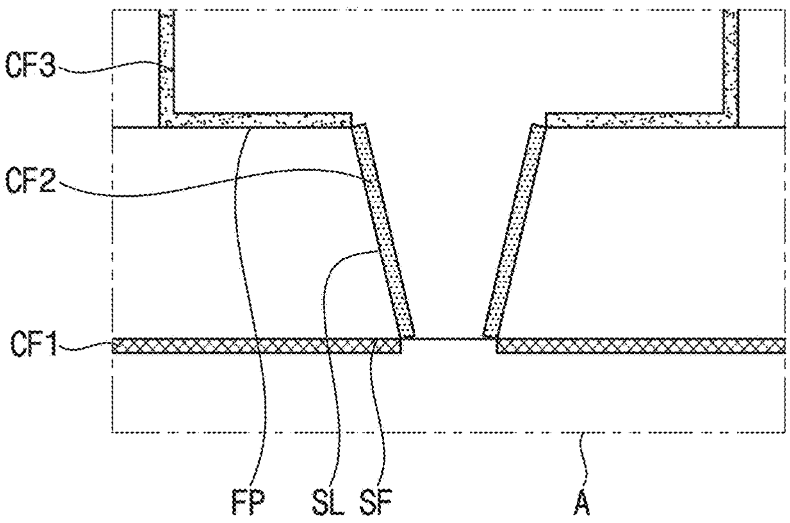
FIG. 3 is an enlarged cross-sectional view of area A of FIG. 2.

FIG. 3 is an enlarged cross-sectional view of area A of FIG. 2.

Referring further to FIG. 3, the surface SF of the head, the inner wall SL, and the flow path FP may be coated with different coating films, respectively. That is, the surface SF of the head, the inner wall SL, and the flow path FP may be coated with different materials, respectively. The coating film CF may include a self-assembled monolayer SAM.

In an embodiment, the coating film CF may include a first coating film CF1, a second coating film CF2, and a third coating film CF3. The first coating layer CF1 may be coated on the surface SF of the head, the second coating layer CF2 may be coated on the inner wall SL, and the third coating layer CF3 may be coated on the flow path FP. The first to third coating layers CF1, CF2, and CF3 may include different materials, respectively.

In an embodiment, a surface energy of each of the first coating layer CF1, the second coating layer CF2, and the third coating layer CF3 may be different from each other. The surface energy of the first coating layer CF1 may be less than the surface energy of the second coating layer CF2 or the surface energy of the third coating layer CF3.

In an embodiment, the surface energy of the first coating layer CF1 may be less than the surface energy of the second coating layer CF2, and the surface energy of the second coating layer CF2 may be less than the surface energy of the third coating layer CF3.

In an embodiment, for example, the surface energy of the first coating layer CF1 may be about 20 millinewtons per meter (mN/m) or less. The first coating layer CF1 may have liquid repellency. If the surface energy of the first coating layer CF1 is greater than about 20 mN/m, the first coating layer CF1 may be wetted by the ink. Accordingly, an ejection direction of the ink is changed, and satellite may be generated, such that the ink ejection accuracy may decrease.

The surface energy of the second coating layer CF2 may be about 14 mN/m or greater. In a case where the surface energy of the second coating layer CF2 is less than about 20 mN/m, the desired meniscus pressure of the ink may increase. In this case, bubbles may be generated when air is trapped inside the nozzle NZ or the ink supply unit IS, such that defects may occur, and process efficiency may decrease. In an embodiment, where surface energy of the second coating film CF2 is between (or in a range of) about 14 mN/m and about 20 mN/m, such structural defects may be avoided or effectively prevented from occurring by changing a design of the head.

In such an embodiment, the surface energy of the third coating layer CF3 may be about 14 mN/m or greater, and also be greater than the surface energy of the second coating layer CF2.

However, the disclosure is not limited thereto, and each of the surface energy of the second coating layer CF2 and the surface energy of the third coating layer CF3 may be substantially the same as the surface energy of the first coating layer CF1.

In an embodiment, the surface SF of the head, the inner wall SL, and the flow path FP are coated with different coating films CF in the inkjet head 10, so that the coating layer CF coated on each of the surface SF of the head, the inner wall SL, and the flow path FP may have different surface energies from each other. Accordingly, in such an embodiment, the residue of particles in the ink may be effectively prevented from remaining on the inner surface of the inkjet head 10. In such an embodiment, the ink ejection accuracy of the inkjet head 10 with respect to the outer surface of the inkjet head 10 may be improved.

Figure 4:
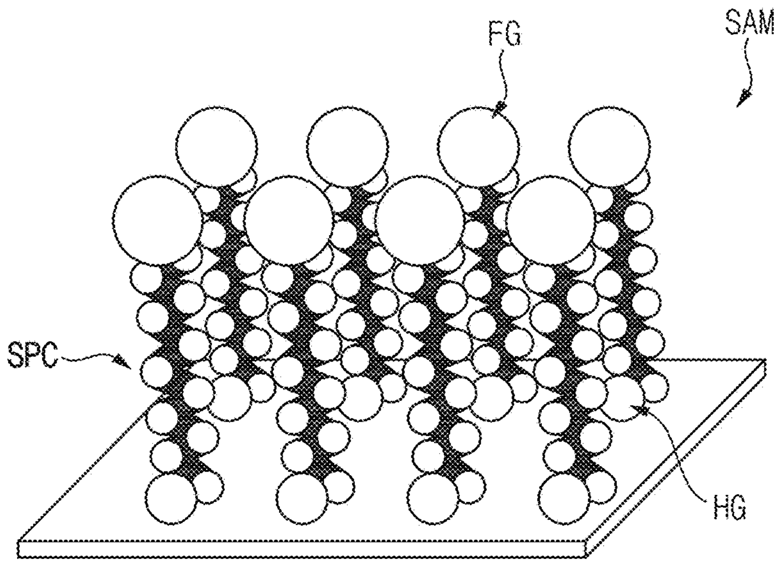
FIG. 4 is an enlarged view illustrating a portion of the coating film of FIG. 3.

FIG. 4 is an enlarged view illustrating a portion of the coating film of FIG. 3. Particularly, FIG. 4 may be a detailed structure of the self-assembled monolayer of FIG. 3.

Further referring to FIG. 4, each of the first coating layer CF1, the second coating layer CF2, and the third coating layer CF3 may include different materials, respectively. In an embodiment, each of the first coating layer CF1, the second coating layer CF2, and the third coating layer CF3 may have a self-assembled monolayer structure SAM.

The self-assembled monolayer structure SAM may include a head part HG and a tail part TG. The head part HG may be coupled to an object to be deposited (e.g., the surface SF of the head, the inner wall SL, or the flow path FP). The tail part TG may be connected to the head part HG. The tail part TG may include a spacer SPC and a substituent FG.

In an embodiment, the first coating layer CF1 may include a material having a contact angle in a range of about 100 degrees to about 200 degrees based on pure water. In such an embodiment, the first coating layer CF1 may have hydrophobicity. However, the disclosure is not limited thereto.

The first coating layer CF1 may include a first head part and a first tail part. The first head part may be coupled to the surface SF of the head. The first tail part may be connected to the first head part. The first tail part may include a spacer SPC and a substituent FG. The spacer SPC may be connected to the first head part, and the substituent FG may be a functional group finishing (or at an end of) the spacer SPC.

The first head part may include silicon (Si) and may be finished (or include an end) with a methoxy group (—$OCH_3$, methoxy), chlorine (—Cl), sulfuric acid (—SH, Thiol), hydrogen (—H), or the like.

The first tail part may include an ether group. In an embodiment, the spacer SPC may have a structure in which an ether group having between 8 and 50 carbon atoms is bonded. In such an embodiment, at least one oxygen (O) may be included in the spacer (SPC).

In an embodiment, the first tail part may include a fluorine functional group. In such an embodiment, the first tail part may be finished with a functional group containing fluorine (F). In an embodiment, for example, the fluorine functional group may include at least one selected from —F, —CF, —$CF_2$, and —$CF_3$. However, the disclosure is not limited thereto.

In an embodiment, the second coating layer CF2 may include a material having a contact angle in a range of about 10 degrees to about 120 degrees based on pure water. In such an embodiment, the second coating layer CF2 may have hydrophilicity. However, the disclosure is not limited thereto.

The second coating layer CF2 may include a second head part and a second tail part. The second head part may be coupled to the inner wall SL. The second tail part may be connected to the second head part. The second tail part may include a spacer and a substituent. The spacer may be connected to the second head part, and the substituent may be an alkyl group or a functional group finishing the spacer.

The second tail part may include an alkyl group. In an embodiment, the spacer may have a structure in which an alkyl group having 2 to 50 carbon atoms is bonded.

In an embodiment, the second tail part may include an alkyl group or a fluorine functional group. In such an embodiment, the second tail part may be finished with an alkyl group or a functional group containing fluorine. In an embodiment, for example, the alkyl group may include —$CH_3$, and the fluorine functional group may include at least one selected from —F, —CF, —$CF_2$, and —$CF_3$. However, the disclosure is not limited thereto.

In an embodiment, the third coating layer CF3 may include a material having a contact angle in a range of about 10 degrees to about 120 degrees based on pure water. In such an embodiment, the third coating layer CF3 may have hydrophilicity. However, the disclosure is not limited thereto.

The third coating layer CF3 may include a third head part and a third tail part. The third head part may be coupled to the flow path FP. The third tail part may be connected to the third head part. The third tail part may include a spacer and a substituent. The spacer may be connected to the third head part, and the substituent may be an alkyl group or a functional group finishing the spacer.

In an embodiment, the third tail part may include an alkyl group. In such an embodiment, the spacer may have a structure in which an alkyl group having 2 to 50 carbon atoms is bonded.

In an embodiment, the third tail part may include an alkyl group or a fluorine functional group. In such an embodiment, the third tail part may be finished with an alkyl group or a functional group containing fluorine. In an embodiment, for example, the alkyl group may include at least one selected from H, —CH, —$CH_2$, and —$CH_3$, and the fluorine functional group may include at least one selected from —F, —CF, —$CF_2$, and —$CF_3$. However, the disclosure is not limited thereto.

In an embodiment, each of the surface SF of the head, the inner wall SL, and the flow path FP may be coated with a self-assembled monolayer having a different structure. Accordingly, the residue of particles in the ink may be prevented from remaining on the inner surface of the inkjet head 10. In such an embodiment, durability of the inkjet head 10 against cleaning and scratches on the outer surface of the inkjet head 10 may be improved.

In an embodiment, for example, the cleaning may include purging, wiping, blade, suction, blow, spitting, flushing, or the like.

Figure 5:
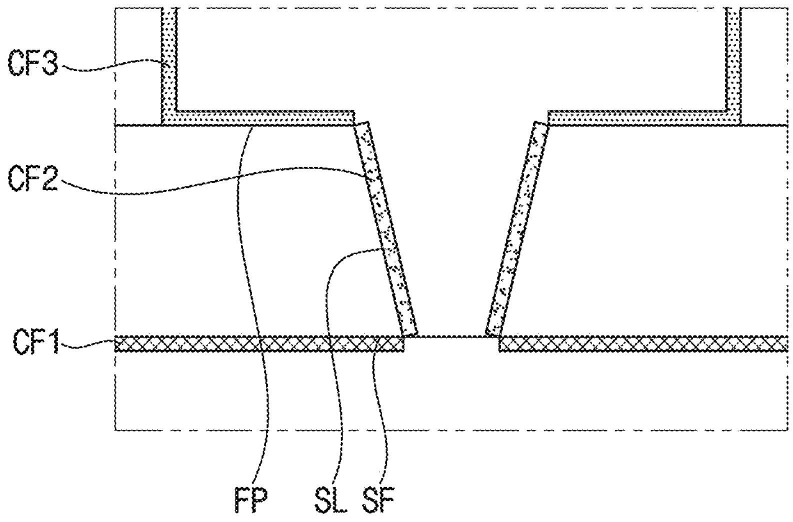
FIG. 5 is a cross-sectional view illustrating an inkjet head according to an alternative embodiment of the disclosure.

FIG. 5 is a cross-sectional view illustrating an inkjet head according to an alternative embodiment of the disclosure. Particularly, FIG. 5 shows a portion of the inkjet head corresponding to that shown in FIG. 3.

Referring to FIG. 5, in an embodiment, the surface SF of the head, the inner wall SL, and the flow path FP may be coated with different coating films, respectively. In such an embodiment, the surface SF of the head, the inner wall SL, and the flow path FP may be coated with different materials, respectively. The coating film CF may include a self-assembled monolayer SAM.

In such an embodiment, the coating film CF may include a first coating film CF1, a second coating film CF2, and a third coating film CF3. The first coating layer CF1 may be coated on the surface SF of the head, the second coating layer CF2 may be coated on the inner wall SL, and the third coating layer CF3 may be coated on the flow path FP. The first to third coating layers CF1, CF2, and CF3 may include different materials, respectively.

In an embodiment, the surface energy of each of the first coating layer CF1, the second coating layer CF2, and the third coating layer CF3 may be different from each other. The surface energy of the first coating layer CF1 may be less than the surface energy of the second coating layer CF2 or the surface energy of the third coating layer CF3.

In an embodiment, the surface energy of the first coating layer CF1 may be less than the surface energy of the third coating layer CF3, and the surface energy of the third coating layer CF3 may be less than the surface energy of the second coating layer CF2.

In an embodiment, for example, the surface energy of the first coating layer CF1 may be about 20 mN/m or less. The first coating layer CF1 may have liquid repellency. In such an embodiment where the surface energy of the first coating layer CF1 is about 20 mN/m or less, the first coating layer CF1 may not be wetted by the ink, and thus, the ink ejection accuracy may be improved.

In an embodiment, the surface energy of the second coating layer CF2 may be about 20 mN/m or greater. In such an embodiment where the surface energy of the second coating layer CF2 is about 20 mN/m or greater, the second coating layer CF2 may have a relatively hydrophilic property. Accordingly, the meniscus pressure of the ink inside the inner wall SL may decrease, such that process efficiency may be improved.

In an embodiment, the surface energy of the third coating layer CF3 may be about 10 mN/m or greater and also be greater than the surface energy of the first coating layer CF1. In such an embodiment where the surface energy of the second coating layer CF2 is about 10 mN/m or greater, particles included in the ink may be effectively prevented from remaining inside the nozzle NZ or the ink supply unit IS. In such an embodiment, air may be effectively prevented from entering into the nozzle NZ or the ink supply unit IS.

However, the disclosure is not limited thereto, and the coating film may not be formed on the inner wall SL, and the coating film may be formed only on the surface SF of the head and the flow path FP.

FIGS. 6 to 15 are views illustrating a method of manufacturing an inkjet head according to an embodiment of the disclosure.

An embodiment of a method of manufacturing an inkjet head shown in FIGS. 6 to 15 may be a method of manufacturing the inkjet head 10 described with reference to FIGS. 1 to 4. Therefore, any repetitive detailed descriptions of the same or like elements of the inkjet head as those described above may be omitted.

Figure 6:
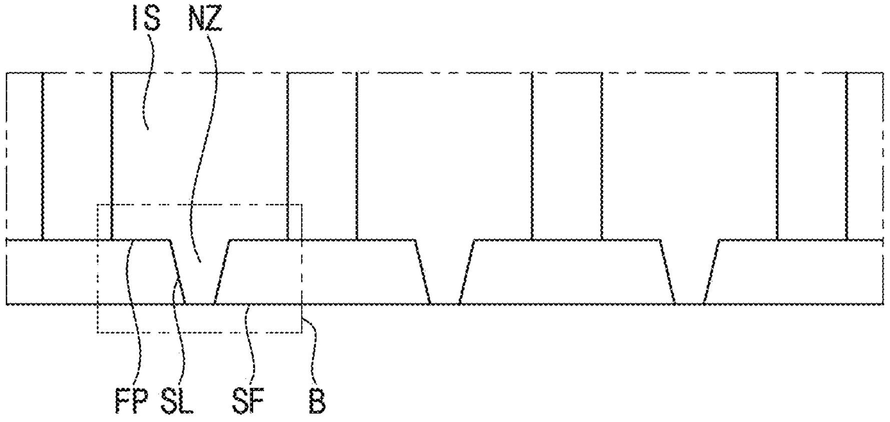
FIGS. 6 to 15 are views illustrating a method of manufacturing an inkjet head according to an embodiment of the disclosure.
Figure 7:
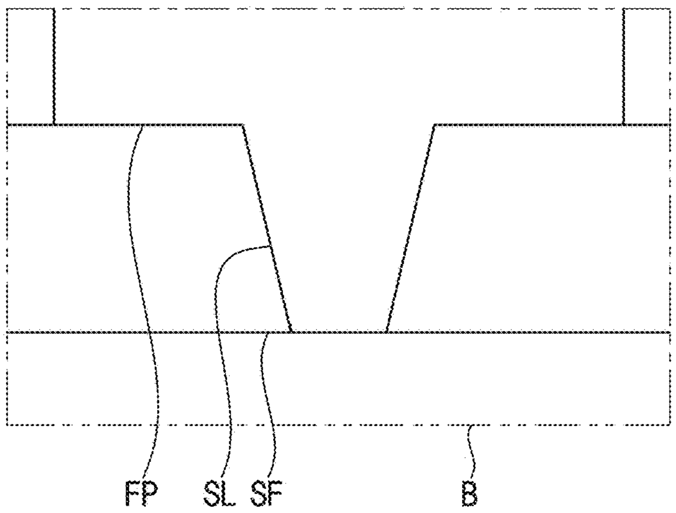

Referring to FIGS. 6 and 7, in an embodiment of a method of manufacturing an inkjet head 10, a nozzle NZ may be formed. An ink supply unit IS connected to the nozzle NZ may be formed. A surface SF of the head exposing the nozzle NZ may be formed.

The nozzle NZ may include an inner wall SL through which ink passes. The surface SF of the head may be connected to a first end of the inner wall SL. The ink supply unit IS may include a flow path FP connected to a second end of the inner wall SL.

In an embodiment, before the surface SF of the head, the inner wall SL, and the flow path FP are coated, an existing coating film (e.g., polytetrafluoroethylene (PTFE) or perfluoroalkoxy alkane (PFA)) may be removed. However, the disclosure is not limited thereto.

Referring to FIGS. 8 to 13, the surface SF of the head, the inner wall SL, and the flow path FP may be coated with different coating films CF, respectively. In an embodiment, the surface SF of the head, the inner wall SL, and the flow path FP may be coated with different materials, respectively. The coating film CF may be formed in a self-assembled monolayer method.

Figure 8:
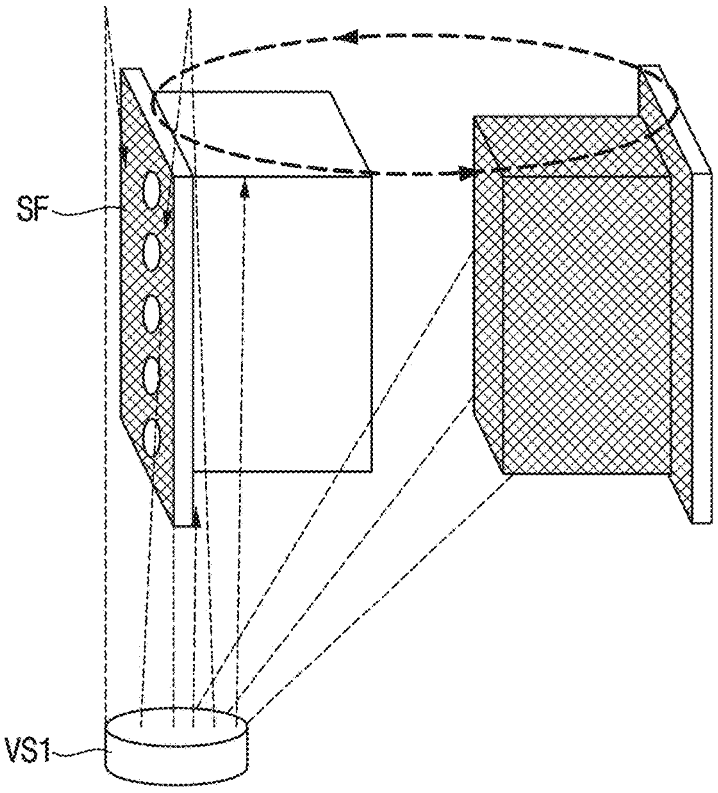
Figure 9:
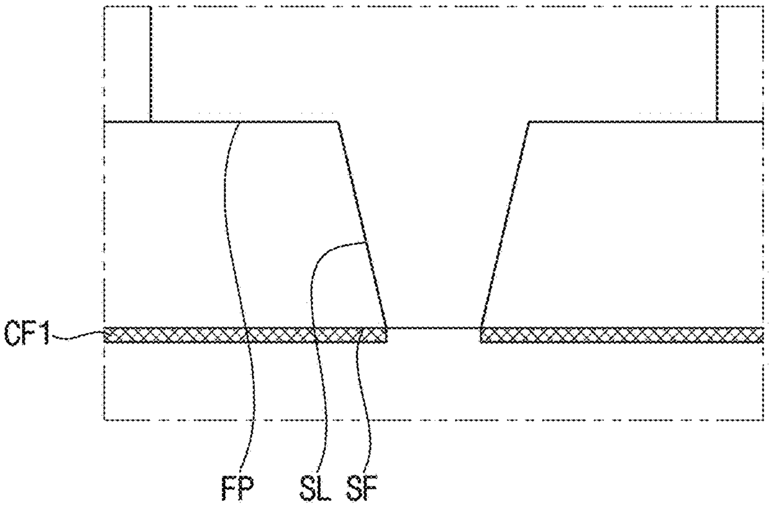

FIG. 8 is a view illustrating a process of coating the surface SF of the head. FIG. 9 is a view illustrating a state in which the surface SF of the head is coated.

Referring to FIGS. 8 and 9, a first coating layer CF1 may be coated on the surface SF of the head. The first coating layer CF1 may include or be formed of a self-assembled monolayer (e.g., the self-assembled monolayer SAM of FIG. 4).

The first coating layer CF1 may be formed by a physical vapor deposition (PVD) process.

In an embodiment, the surface SF of the head may rotate in a state perpendicular to a first deposition source VS1. In an embodiment, for example, a rotating plate may rotate the inkjet head 10 in a state in which the surface SF of the head is vertical to the rotating plate. A portion of a deposition material ejected from the first deposition source VS1 may be directly deposited on the surface SF of the head. In addition, another portion of the deposition material ejected from the first deposition source VS1 may be bounced off the rotating plate and deposited on the surface SF of the head.

The deposition material ejected from the first deposition source VS1 may not be deposited on the inner surface except for the surface SF of the head. In an embodiment, for example, a chamber in which the inkjet head 10 is located may be in a high vacuum state. In such an embodiment, the air inside the chamber may be continuously removed, such that air inside the inkjet head 10 may also come out. Therefore, the deposition material may not enter the inner surface due to the air flow inside the inkjet head 10. Therefore, the deposition material may not be deposited on the inner surface of the inkjet head 10 and the deposition material may be deposited only on the surface SF of the head.

Figure 10:
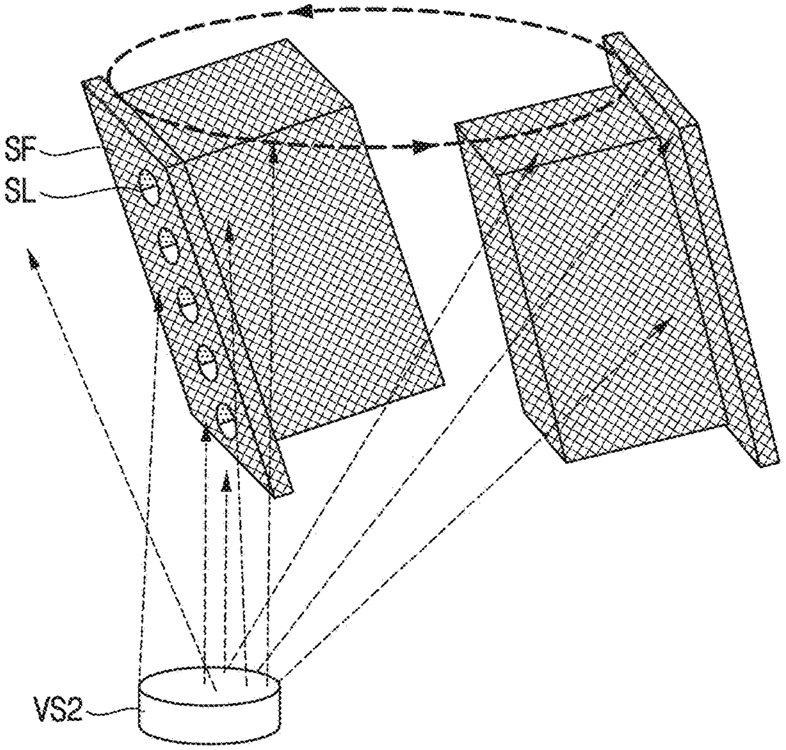
Figure 11:
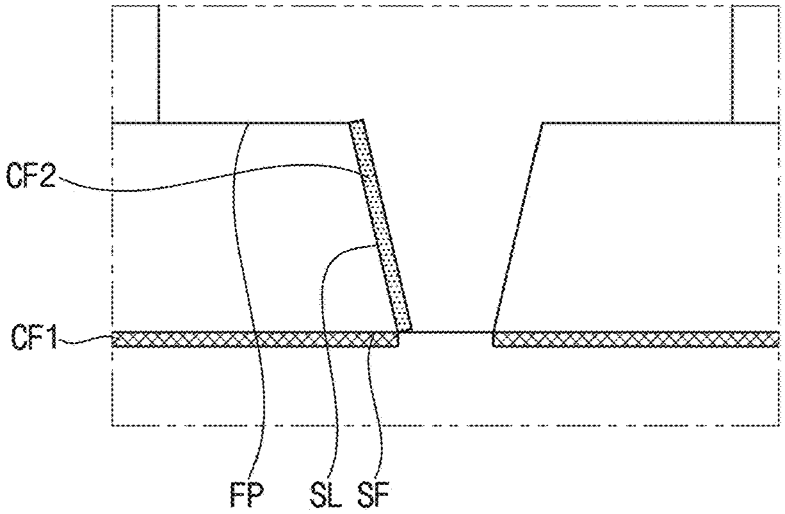
Figure 12:
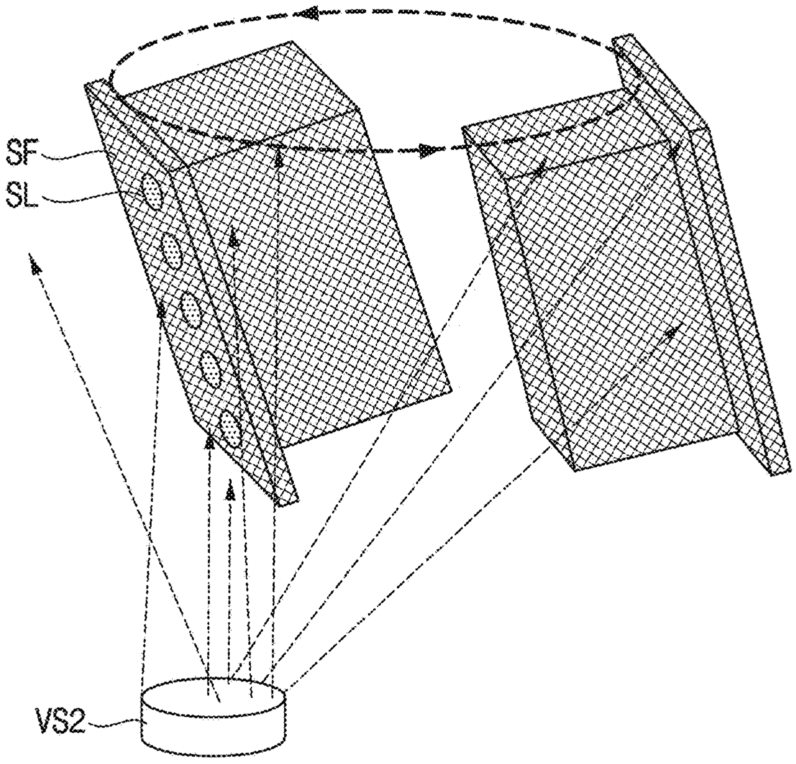
Figure 13:
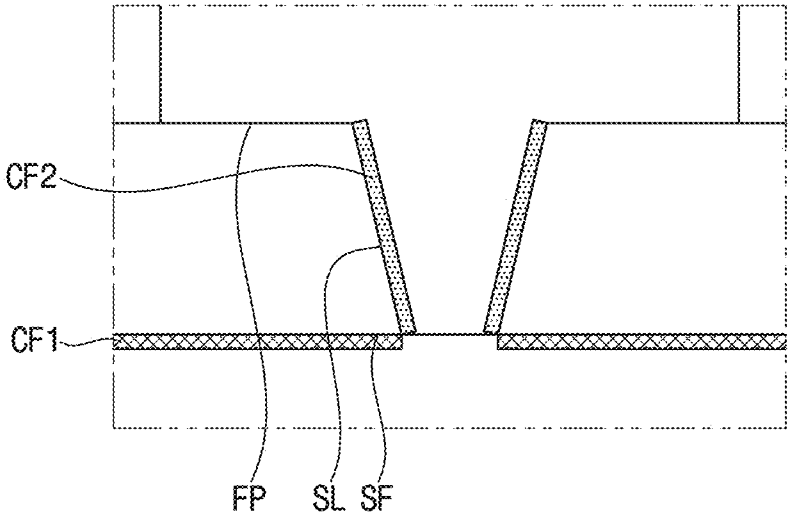

FIG. 10 is a view illustrating a process of coating a portion of the inner wall SL. FIG. 11 is a view illustrating a state in which a portion of the inner wall SL is coated. FIG. 12 is a view illustrating a process of coating the remaining portion of the inner wall SL. FIG. 13 is a view illustrating a state in which the remaining portion of the inner wall SL is coated.

Referring to FIGS. 10 and 11, a second coating layer CF2 may be coated on the inner wall SL. The second coating layer CF2 may include or be formed of a self-assembled monolayer different from the self-assembled monolayer of the first coating layer CF1.

The second coating layer CF2 may be formed through a PVD process.

In an embodiment, the surface SF of the head may be rotated in an inclined state with respect to the second deposition source VS2. In an embodiment, for example, the rotating plate may rotate the inkjet head 10 while the surface SF of the head is inclined with respect to the second deposition source VS2. In this case, since the inkjet head 10 rotates in an inclined state with respect to the second deposition source VS2, the deposition material from the second deposition source VS2 may reach the inner surface of the inkjet head 10, and be deposited on the inner surface. In such an embodiment, the deposition material of the second deposition source VS2 may be deposited only on a portion of the inner wall SL.

Further referring to FIGS. 12 and 13, thereafter, the inkjet head 10 may be turned upside down. The deposition material of the second deposition source VS2 may be deposited while the inkjet head 10 is upside down. In this case, the deposition material may be deposited on the remaining portion of the inner wall SL. Accordingly, the deposition material of the second deposition source VS2 may be entirely deposited on the inner wall SL.

The deposition material from the second deposition source VS2 may not be deposited on the surface SF of the head. Since a uniform self-assembled monolayer is already formed on the surface SF of the head, there may be no space in which the deposition material can be deposited.

The deposition material from the second deposition source VS2 may also be overcoated on the surface SF of the head. In this case, the overcoated deposition material may be easily removed through a simple cleaning process, such that the deposition material from the second deposition source VS2 may be deposited only on the inner wall SL.

Figure 14:
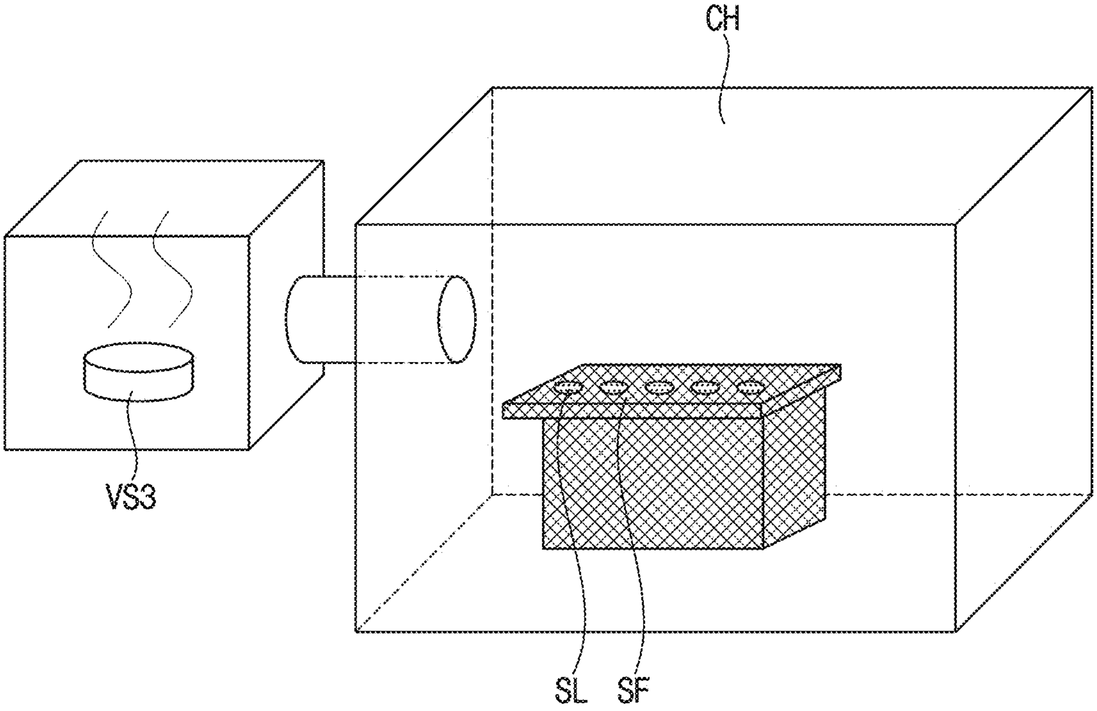
Figure 15:
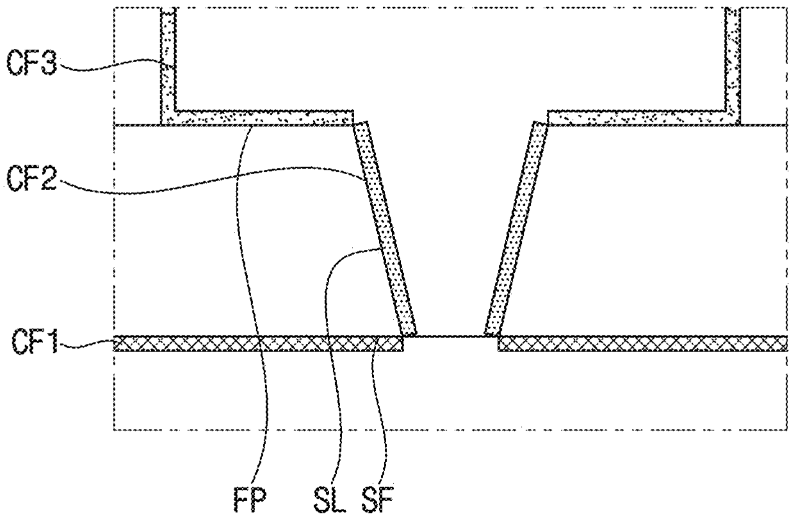

FIG. 14 is a view illustrating a process of coating the flow path FP. FIG. 15 is a view illustrating a state in which the flow path FP is coated.

Referring to FIGS. 14 and 15, a third coating layer CF3 may be coated on the flow path FP. The third coating layer CF3 may be formed of a self-assembled monolayer different from the first coating layer CF1 and the second coating layer CF2.

The third coating layer CF3 may be formed by sublimating and depositing the third deposition source VS3.

In an embodiment, the third deposition source VS3 may be sublimated. After the third deposition source VS3 is sublimated, the sublimated third deposition source VS3 may be introduced into a chamber CH where the inkjet head 10 is located. In an embodiment, the sublimated third deposition source VS3 may be introduced into the chamber CH through a pressure difference. The introduced third deposition source VS3 may be introduced into the inkjet head 10. Accordingly, the deposition material from the third deposition source VS3 may be deposited on the flow path FP. Accordingly, the third deposition source VS3 may coat the flow path FP.

The deposition material from the third deposition source VS3 may not be deposited on the surface SF and the inner wall SL of the head. Since a uniform self-assembled monolayer is already formed on the surface SF and the inner wall SL of the head, there may be no space in which the deposition material can be deposited.

In an embodiment, the deposition material from the third deposition source VS3 may also overcoat the surface SF and the inner wall SL of the head. In such an embodiment, the overcoated deposition material may be easily removed through a simple cleaning process, such that the deposition material from the third deposition source VS3 may be deposited only on the flow path FP.

In an embodiment, the surface SF of the head, the inner wall SL, and the flow path FP are formed by different processes, respectively, so that each of the surface SF of the head, the inner wall SL, and the flow path FP may be coated with different materials, respectively.

In embodiments of the invention, as described above, the surface SF of the head, the inner wall SL, and the flow path FP are coated with different coating films CF, respectively, so that the coating films CF respectively coated on the surface SF of the head, the inner wall SL, and the flow path FP may have different surface energies from each other. Accordingly, the residue of particles in the ink may be effectively prevented from remaining on the inner surface of the inkjet head 10 such that the ink ejection accuracy of the inkjet head 10 with respect to the outer surface of the inkjet head 10 may be improved.

The inkjet devices and the methods according to embodiments may be applied to a display device included in various electronic device such as a computer, a notebook, a mobile phone, a smartphone, a smart pad, a personal media player (PMP), a personal digital assistant (PDA), an MP3 player, or the like.

The invention should not be construed as being limited to the embodiments set forth herein. Rather, these embodiments are provided so that this disclosure will be thorough and complete and will fully convey the concept of the invention to those skilled in the art While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An inkjet head comprising:

a nozzle which ejects an ink and includes an inner wall through which the ink passes;

a head surface which exposes the nozzle and is connected to a first end of the inner wall;

an ink supply unit which supplies the ink to the nozzle and includes a flow path connected to a second end of the inner wall opposite to the first end;

wherein the head surface, the inner wall, and the flow path are coated with different coating films, respectively; and wherein at least a first coating film of the different coating films, a second coating film of the different coating films-, and a third coating film of the different coating films includes different materials, respectively.

2. The inkjet head of claim 1, wherein the different coating films include a self-assembled monolayer.

3. An inkjet head comprising:

a nozzle which ejects an ink and includes an inner wall through which the ink passes;

a head surface which exposes the nozzle and is connected to a first end of the inner wall;

an ink supply unit which supplies the ink to the nozzle and includes a flow path connected to a second end of the inner wall opposite to the first end;

wherein the head surface, the inner wall, and the flow path are coated with different coating films, respectively;

wherein the different coating films include:

a first coating film coated on the head surface;

a second coating film coated on the inner wall;

a third coating film coated on the flow path; and the first coating film, the second coating film, and the third coating film include different materials, respectively.

4. The inkjet head of claim 3, wherein a surface energy of the first coating film is less than a surface energy of the second coating film or a surface energy of the third coating film.

5. The inkjet head of claim 4, wherein the surface energy of the first coating film is less than the surface energy of the second coating film, and the surface energy of the second coating film is less than the surface energy of the third coating film.

6. The inkjet head of claim 4, wherein the surface energy of the first coating film is less than the surface energy of the third coating film, and the surface energy of the third coating film is less than the surface energy of the second coating film.

7. The inkjet head of claim 4, wherein the surface energy of the first coating film is about 20 mN/m or less.

8. The inkjet head of claim 4, wherein the surface energy of the second coating film is about 14 mN/m or less.

9. The inkjet head of claim 3, wherein the first coating film includes a first head part coupled to the head surface and a first tail part connected to the first head part.

10. The inkjet head of claim 9, wherein the first tail part includes a fluorine functional group.

11. The inkjet head of claim 9, wherein the first tail part includes an ether group.

12. The inkjet head of claim 3, wherein the second coating film includes a second head part coupled to the inner wall and a second tail part connected to the second head part and including an alky group or a fluorine functional group.

13. The inkjet head of claim 3, wherein the third coating film includes a third head part coupled to the flow path and a third tail part connected to the third head part and including an alkyl group or a fluorine functional group.

14. The inkjet head of claim 3, wherein the first coating film includes a material having a contact angle in a range of about 100 degrees to about 200 degrees based on pure water.

15. The inkjet head of claim 3, wherein the third coating film includes a material having a contact angle in a range of about 10 degrees to about 120 degrees based on pure water.

16. A method of manufacturing an inkjet head, the method comprising:

providing a nozzle including an inner wall through which an ink passes;

providing a head surface exposing the nozzle and connected to a first end of the inner wall;

providing an ink supply unit including a flow path connected to a second end of the inner wall opposite to the first end; and coating the head surface, the inner wall, and the flow path with different coating films, respectively, wherein at least a first coating film of the different coating films, a second coating film of the different coating films, and a third coating film of the different coating films includes different materials, respectively.

17. The method of claim 16, wherein the coating the head surface, the inner wall, and the flow path with the different coating films, respectively, includes, coating the first coating film on the head surface;

coating the second coating film on the inner wall; and coating the third coating film on the flow path.

18. The method of claim 17, wherein the first coating film, the second coating film, and the third coating film are formed in a self-assembled monolayer method.

19. The method of claim 17, wherein the coating the first coating film on the head surface is performed by a physical vapor deposition process, and the head surface is rotated in a state perpendicular to a deposition source during the physical vapor deposition process.

20. The method of claim 17, wherein the coating the second coating film on the inner wall is performed by a physical vapor deposition process, and the head surface is rotated in an inclined state with respect to a deposition source during the physical vapor deposition process.

* * * * *